(No Model.)
O. C. FLICK.
ELECTRODE FOR SECONDARY BATTERIES.
No. 456,558. Patented July 28, 1891.
Fig. 2. Fig. 1. Fig. 3.
 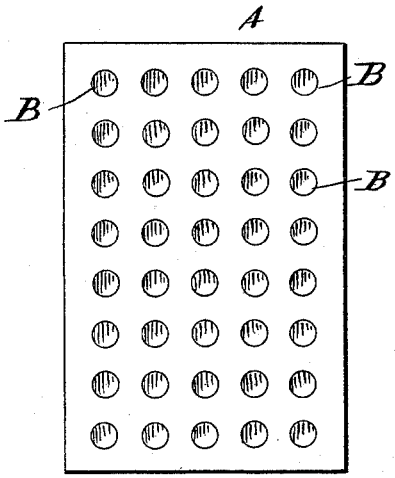 
Fig. 4. Fig. 5. Fig. 6.
  
WITNESSES:
Jno. N. Rosenbaum.
Carl Karn
INVENTOR
Otis C. Flick
BY
Gaeper Raegener
ATTORNEYS.

UNITED STATES PATENT OFFICE.

OTIS C. FLICK, OF BROOKLYN, ASSIGNOR TO THE WELLINGTON MANUFACTURING COMPANY, OF NEW YORK, N. Y.

ELECTRODE FOR SECONDARY BATTERIES.

SPECIFICATION forming part of Letters Patent No. 456,558, dated July 28, 1891.

Application filed January 3, 1887. Renewed March 7, 1889. Serial No. 302,391. (No model.)

*To all whom it may concern:*

Be it known that I, OTIS C. FLICK, of Brooklyn, in the county of Kings and State of New York, have invented certain new and useful Improvements in Electrodes for Secondary Batteries, of which the following is a specification.

This invention relates to certain new and useful improvements in electrodes for secondary batteries, which electrodes consist of a conducting-plate containing active material.

The object of my invention is to provide an electrode which is durable, easily manufactured, has great conductivity, and is composed of such materials so disposed and combined that in the process of manufacture the body shall remain unacted upon, while designated portions shall become active.

It is of prime importance in secondary batteries that a non-variable high conductor and support be provided with which the active substance can be thoroughly and durably combined, and this is a further object of the present invention. Peroxide of lead is not a good conductor in thick strata or large mass, but has a high potential which renders it specially suitable for use in batteries. On account of these strange properties a non-corrosive and therefore non-active plate is of special importance, rendering it feasible to provide a large surface upon which sufficient peroxide can be formed without too great an increase in the weight of the cell. This is another object of my invention. The more intimately the active portion is combined with the conducting plate or support, and yet preserved in the greatest purity, (especially when lead,) the less local action will take place.

The invention consists in a body or plate composed of an alloy of lead and tin, or of gold, platinum, or other material which is not affected injuriously either in the process of manufacture or in the operation of the battery, said plate having certain parts or portions extending through or partly through composed of metallic lead. The plate is subjected to the action of chemicals or the electric current, which converts the portions composed of pure lead into a salt or oxide of lead, which is in turn reduced by electrolysis to lead in a spongy state, and thus I obtain a plate composed of a metal or an alloy not affected injuriously in the operation of the battery, incorporating within its boundaries or holding upon its surface active material.

In the accompanying drawings, Figure 1 is a face view of my improved electrode. Fig. 2 is a cross-sectional view of the same. Figs. 3, 4, 5, and 6 are cross-sectional views of modifications.

Similar letters of reference indicate corresponding parts.

The plate A, composed, preferably, of an alloy of lead and tin or of gold, platinum, or any other material that is not affected injuriously by the exciting-liquids usually used in secondary batteries, is provided with a series of apertures B, or with grooves, notches, apertures, recesses, or cavities, which may be formed in the faces of the said plate, or, if desired, in projections on the same. Into the said cavities, recesses, notches, or apertures is poured pure metallic lead in a molten state, or I make blocks of solid lead fitting into said cavities, apertures, or recesses and insert them; or said apertures, cavities, or recesses are filled or charged with pure metallic lead in solid pieces in any other suitable manner. The lead referred to above, it is to be distinctly understood, is in the ordinary metallic state—that is, it is not granular or spongy or disintegrated. This plate is then placed into a vat containing moistened tan-bark impregnated with acetic acid, the same as is used for carbonating lead in the manufacture of white lead. This plate I leave in the tan-bark until all the portions of the metallic lead are converted. The plate itself is not corroded if made of gold or platinum, and if made of an alloy of lead and tin is corroded slightly on the surface only, whereas the blocks or pieces of pure metallic lead are entirely converted into carbonate. I then subject the plate and the parts of the carbonate of lead or salts of lead held in or on the same to an electrolytic action for converting the said carbonate of lead held in or on the plate into lead of a spongy or granular nature, such as is adapted for use as future active material in electrodes for secondary batteries.

It is to be distinctly understood that the spongy or granular lead is not packed into the apertures of the plate, but that the pure metallic lead is cast or forced into said apertures and converted while in the plate. It is also to be distinctly understood that the plate is not to be converted, but retains its original metallic consistency. The pieces of pure metallic lead held in or on the plate can also be converted into oxide of lead in any electrolyte by means of electrolysis, and this oxide of lead can then by electrolytical action be converted into spongy or granular lead. The pieces of lead can also be converted into a lead-salt, which is then reduced to spongy or granular lead in the following manner: The plate is immersed in a mixture of dilute sulphuric and nitric acid, whereby the lead is converted into lead-sulphate, and the plate itself is but feebly acted upon. This sulphate may be reduced to spongy or granular lead by electrolysis in a solution of caustic lime as an electrolyte, the plate being the negative pole of the electrolytic cell.

Having thus described my invention, I claim as new and desire to secure by Letters Patent—

1. The herein-described method of making electrodes for secondary batteries, consisting in casting or placing pure metallic lead into apertures, cavities, or recesses or upon the surface of a plate composed of a metal or alloy that is not affected injuriously by the exciting-liquid of the battery, then converting the pure metallic lead into a carbonate of lead or other salt or oxide of lead, and then converting said converted pure metallic lead into lead of a spongy or granular nature while held in the cavities or apertures or upon the surface of the plate, substantially as shown and described.

2. A plate, element, or electrode for secondary batteries, composed of a metal or alloy not affected injuriously by the exciting-liquid of the battery, which plate has points or portions of pure metallic lead extending through or partly through said plate, substantially as herein shown and described.

3. In the manufacture of electrodes for secondary batteries, the improvement consisting in applying pure metallic lead in solid pieces on or in the plate at intervals by casting or forcing, and then converting said metal by suitable steps into lead of a granular or spongy state, substantially as shown and described.

In testimony that I claim the foregoing as my invention I have signed my name in presence of two subscribing witnesses.

OTIS C. FLICK.

Witnesses:
MARTIN PETRY,
CARL KARP.